United States Patent [19]
Borzage

[11] Patent Number: 5,971,414
[45] Date of Patent: Oct. 26, 1999

[54] SAILBIKE

[76] Inventor: K. Michael Borzage, 1662 Vallombrosa Ave., Chico, Calif. 95926

[21] Appl. No.: 08/719,434

[22] Filed: Sep. 25, 1996

[51] Int. Cl.⁶ .................................................. B62B 15/00
[52] U.S. Cl. ...................................... 280/213; 114/102.3
[58] Field of Search ................................... 280/213, 212, 280/215, 810, 214, 16; 114/102.3; D12/111, 1, 2, 4, 114

[56] References Cited

U.S. PATENT DOCUMENTS

| | | | |
|---|---|---|---|
| 947,731 | 1/1910 | Couder | 280/213 |
| 2,038,166 | 6/1936 | Deal . | |
| 3,836,176 | 9/1974 | Ylvisaker | 280/213 |
| 3,986,722 | 10/1976 | Patterson | 280/213 |
| 4,049,287 | 9/1977 | Dudouyt | 280/213 |
| 4,234,211 | 11/1980 | Lux | 280/810 |
| 4,296,704 | 10/1981 | Bridge | 114/103 |
| 4,332,395 | 6/1982 | Zech | 281/213 |
| 4,408,772 | 10/1983 | Höllwarth | 280/213 |
| 4,557,495 | 12/1985 | Kindermann | 280/213 |
| 4,738,469 | 4/1988 | Alexander | 280/213 |

FOREIGN PATENT DOCUMENTS 0021468 of 1903 United Kingdom ................... 280/213

*Primary Examiner*—Anne Marie Boehler

[57] ABSTRACT

A vertically placed, lift generating wing is affixed adjacent to, and forward of the steering head of a bicycle, or pedal cycle. This results in a conversion into a wind powered, sail propelled, vehicle for use as recreational enjoyment, as well as a practical mode of transportation. The resulting sail bike utilizes a mast attachment bracket (8) to support a lift generating wing which is generally comprised of; sail (1), sail luff pocket (2), mast (3), boom (5), sail trim rigging (10), battens (14) and other rigging and fasteners. The sail bike can properly perform all of the functions characteristic of a true sailing vehicle, including; sailing throughout course headings of 270 degrees relative to the wind's direction, beating, reaching, and running, and it will also permit safe and immediate execution of all maneuvers common to sailing vessels, including tacking, jibing and continuous sail trimming. The advantage of the sail bike is in the simplicity of the design, the ease of set up, and in its highly efficient operation as a sailing vehicle.

5 Claims, 11 Drawing Sheets

DETAIL A - A

SAILBIKE

BACKGROUND

1. Field of Invention

This invention relates to wind powered, sail propelled bicycles, or pedal cycles, especially those used for transportation or recreation.

2. Description of Prior Art

Sailing is defined within many authoritative references, and involves the use of wind power and sails to propel a sailboat. There is no definite term for a sailing bicycle, or a Sailbike.

A true, wind powered, sail propelled vehicle, must be capable of traveling on a course which includes all points of sail common to other successful sailing vessels, and this must include beating to windward, reaching and running before the wind. This course must include headings throughout 270 degrees relative to the winds' direction. Maneuvers that change the vehicles' direction must include tacking, and jibing, and these must be safely executed with immediacy, and without hesitation or delay. The variation of the winds' strength and direction also require that constant trimming adjustment be made to the sails' position. To prevent the sail from trapping the force of a powerful gust of wind, it must be capable of an immediate release all of the force of the wind, while in any position of operation, or during any maneuver. The requirements for sustained operation of the sail and the vehicle it powers must be within the physical limits of its operator.

Prior art in the field of sailing land vehicles indicate a variety of unique solutions have addressed the physical difficulties associated with the placement of a sail rig onto a bicycle, or pedal cycle. However, these previous attempts can be characterized as mechanically complicated devices that are quite unlike the simple sails, masts, and rigging found on successful contemporary sailing vessels, and they all fail to perform as a true sailing vehicle. These failures are categorized as follows:

1. They do not functionally or safely sail course headings throughout 270 degrees relative to the wind's direction, and their courses sailed do not include, beating, reaching, and running before the wind;
    (a) evidenced by sails of other than wing shapes, that do not create adequate lift, and
    (b) evidenced by sails asymmetrically positioned about vehicles' longitudinal axis, and
    (c) evidenced by sails without a boom or supporting outboard spar, especially where these are sheeted to the center of the vehicle's longitudinal axis, and
    (d) evidenced by sails that cannot be properly trimmed or shaped to the changing configuration of the wind, and
    (e) evidenced by undersized sail areas.
2. They maneuver poorly and cannot tack or jibe quickly and safely;
    (a) evidenced by long booms or sails with long foot dimension, and
    (b) evidenced by vehicles with multiple sails, and
    (c) evidenced by sails positioned lower than the bicycle frame, and
    (d) evidenced by sails that require unusual efforts to trim or reposition, and
    (e) evidenced by sails that cannot be retrieved after being fully released.
3. They are not capable of continuous sail trimming;
    (a) evidenced by sails that cannot be continually viewed by the operator, and
    (b) evidenced by vehicles with multiple sails, and
    (c) evidenced by sail rigs that lack the proper sail trimming hardware, and
    (d) evidenced by automatic, self trimming apparatus.
4. They trap the wind and are unable to release it fully, while in any position or during any maneuver,
    (a) evidenced by sails positioned lower than the bicycle frame, and
    (b) evidenced by sails located behind the operator.
5. They require physical strength or balance, that the operator cannot perform or maintain over a sustained period of operation;
    (a) evidenced by booms or sheets positioned above, and requiring the operator to manipulate, above the operators' head, and
    (b) evidenced by absence of proper mechanical purchase on sail trimming sheets, and
    (c) evidenced by long booms that generate large rotational forces, and
    (d) evidenced by unusual requirements to tether the operator's body to the sail.
6. They do not attach readily to standard bicycles, or pedal cycles,
    (a) evidenced by designs requiring unique non-standard bicycle frame configurations, and
    (b) evidenced by attachments that limit non-sailing uses of the bicycle, and
    (c) evidenced by attachments that are structurally inadequate to resist the applied forces.
7. They interfere with the operator's simultaneous use of the vehicles means of pedal propulsion:
    (a) evidenced by absence of any pedals, and
    (b) evidenced by long sail trim sheets.

U.S. Pat. No. 94,731 (Couder, 1909) is a two sail, schooner type rig which cannot produce adequate lift necessary for beating to windward. The foresail utilizes no boom or pole and it's clew is sheeted directly to the longitudinal axis of the bicycle frame. The resulting angle of the sail will not generate sufficient lift for beating to windward, and must be held outboard, by hand, to function when reaching or running. There is no means to prevent the free end of the foresail spar from rotating vertically upward. This will loosen the jib luff tension, severely distort the jib's shape, and render the sail useless during up wind sailing. The foresail spar and the main mast rely on a friction clamp means to resist horizontal rotational forces at their attachment to the bicycle frame. Both are likely to fail. The main sail is located behind the operator, and cannot be continuously trimmed, nor fully release a gust of wind.

U.S. Pat. No. 2,038,166 (Deal, 1935) is a rear positioned sail, with a relatively long foot. To trim the sail a rider must operate a lever which is located behind their back. This lever has a very large negative mechanical relationship to the boom, and is likely to fail to function properly. The vehicle cannot be continuously operated, or continuously trimmed, and cannot perform a controlled tack or jibe maneuver. There is no evidence that the wind force in the mainsail can be fully released.

U.S. Pat. No. 3,836,176 (Yivisaker, 1974) is a small forward positioned, square shaped sail. Its symmetric shape requires the wind to pass over the sail from both its luff side and its leech side on alternating tacks. Lacking a means of reconfiguring the sails' draft location, it cannot develop lift and will not sail to windward. This lack of proper lift also renders this solution totally inadequate for reaching. In the running configuration, the sail's small shape is generally blanketed by the wind shadow from the riders' own body, and provides only a slight improvement for down wind sailing. The wind force in the sail cannot be fully released. The friction clamp means of attachment and sail trimming will not function if a larger sail or alternate sail shape is substituted.

U.S. Pat. No. 3,994,508 (Danner, 1976) is an asymmetrical, side-mounted rig, with an exceptionally long boom and long loose footed sail. This device unsuccessfully attempts to eliminate the operator's need to maintain continuous sail trim with an alternative, self trimming mechanical means. The rig also utilizes a spring mechanism at the mast step, and a boom that flexes but does not rotate. The fixed boom position along the longitudinal axis is set up for a beating configuration. However, the long loose footed sail is extremely inefficient for that purpose. The lack of standard sail sheet trimming eliminates the operator's ability to effectively control the sail's leech tension, which is an important sail trimming function. The lack of a movable outboard spar prevents the sail from being properly shaped or adjusted for running or reaching. There is no apparent means to release the wind force in the sail at any time.

U.S. Pat. No. 4,441,728 (Schroeder, 1984) is a rear-mounted circular sail rig. This sail cannot be continuously trimmed, and the wind force cannot be fully released. The non-wing shaped sail is not capable of generating proper lift. Therefore, the vehicle has is no potential to sail upwind, and reaching is severely restricted. The true sailing angle is likely limited to approximately ninety degrees of downwind sailing.

U.S. Pat. No. 4,557,495 (Kindermann, 1985) is an asymmetrical, front mounted sail rig, with a long footed sail and boom positioned next to the operator and extending nearly to the ground. This long boom creates a large rotational force in the sail which is difficult for the operator to control. To reposition this sail onto a new tack it is necessary to rotate the sail and a portion of the mast, vertically upward and over the operator's head. Consequently, it cannot be tacked or jibed while underway. To maintain sail trim, the rider's body must be tethered to the sail. When the sail is fully released while running, it swings uncontrollably forward and upward overhead, beyond the reach of the operator. When the sail is back winded, it is immediately pinned against the side of the vehicle and has no means to release. The mast attachment bracket relies on a friction clamp means to resist rotational forces and is likely to fail in all but light breezes. The overall sail design suffers in that it is fully symmetric about its mid-height point, from top to bottom. This is a result of the unusual requirement to rotate the sail's topside into the downward position as it tacks and jibes. The space required for the long boom to be fully extended outward in a running position, and then jibed from side to side will restrict the vehicle to roadways with a minimum of three meters of side clearance from obstacles.

U.S. Pat. No. 4,735,429 (Beck, 1988), is a rear-positioned sail rig with a wing like shape. This device unsuccessfully attempts to eliminate the operator's need to maintain continuous sail trim by an automatic self-positioning flexure means. As a result, the sail cannot be continuously trimmed, and there is no means to fully release the force of the wind. If the sail could be released while running it would swing forward striking, and pinning the rider against the vehicle. This system might permit limited upwind sailing success in light winds. However, there is no apparent means to control the sail or boom outward, and therefore it cannot reach, or run, or jibe properly.

U.S. Pat. Nos. 4,634,136 (Alexander, 1987) and 4,738,460 (Alexander, 1989) present design solutions which utilize sails mounted directly to the rider. Both are rear positioned rigs, mounted to the riders back, and suffer from many of the design flaws previously stated. They do not provide realistic sailing solutions.

Other Patents apply to sails mounted to other unique types of land vehicles. However, the nature of the design requirements and limitations of the performance criteria of a sailing bicycle, cycle and the like, make it unique from these other solutions.

U.S. Pat. No. 2,443,565 (Land, 1945) is a four wheel cycle, with a pedal means of propulsion. The unusual design uses a long, four sided truss-like frame. Steering is by means of a long tiller. The sail is a rear positioned, but forward facing. This solution has many of the previously stated problems associated with rear mounted sail rig. The configuration appears only possible of down wind sailing. Additionally, there is no adaptability to a standard bicycle or pedal cycle.

U.S. Pat. No. 3,986,722 (Patterson, 1976) is a unique non-standard two wheeled vehicle, with a forward positioned sail. This mast utilizes a permanently welded mast support bracket affixed to and made an integral part of this unique cycles' frame structure. There is no adaptive means suggested that permit its attachment to a standard bicycle. The mounting position and rearward raked slope of this bracket would prevent a standard bicycle handle bar from performing proper steering operations. As a result, this unique vehicle design requires a non-standard handlebar steering solution. The design also places a long footed sail and boom over the operator's head. This sail will develop a large rotational force about the vertical axis of the mast and over the operator's head, and which the operator has no physical means to overcome. The lack of standard sail sheet trimming eliminates the operators ability to effectively control the sail's leech tension, which is an important sail trimming function. This problem is compounded by the boom's length. To grasp the boom while running, the rider must operate the vehicle from a standing position. When the sail is fully released while running, it will swing uncontrollably forward and upward, fully beyond the reach of the operator. When beating, the operator must maintain pressure on the overhead boom in the physical equivalent of a continuous one arm pull-up. It appears that the vehicle is limited to use in only the lightest of breezes, and only by those operators possessing great physical strength. The non-standard cycle frame is lower than a conventional bicycle, and the necessary pedal means of propulsion has been omitted. The space required for the long boom to be fully extended outward in a running position, and then jibed from side to side, will restrict the vehicle to roadways with a minimum of four meters of side clearance from obstacles.

Thus, it can be concluded from the investigation of prior art, that no previous design exists, for a sail rig and its attachment to a standard bicycle, cycle, or the like, that can successfully utilize the wind's force to propel the vehicle, and that permit its full operation through all points of sail, and performance of all sailing maneuvers including tacking, jibing, and continuous sail trimming, with all of the safety and immediacy common to other sail vessels.

A need therefore exists for a bicycle or pedal cycle vehicle, with a sail rig and its attachments that can satisfy all of these stated criteria, and that can properly perform all of the functions characteristic of a true sailing vehicle for both recreational enjoyment and well as a practical mode of transportation.

OBJECTS AND ADVANTAGES

Accordingly, my Sailbike provides the following objects and advantages. It provides a sail rig and attachment that:

1. will permit wind powered, sail propulsion of a bicycle, cycle or the like, throughout course headings including 270 degrees relative to the winds direction, and will permit the vehicle to sail close hauled, reach, and run before the wind, and 2. will permit safe and immediate execution of all maneuvers common to sailing vessels, including tacking and jibing, and 3. will permit continuous sail trimming, and 4. will permit an immediate release of the forces of the wind, while in any position or during any maneuver, and 5. will permit successful operation for extended periods of time, and 6. will easily affix to a standard design bicycle, cycle, or the like, and 7. will permit the operators simultaneous use of the vehicle's means of pedal propulsion.

The less obvious advantages of the Sailbike are the efficiently and simplicity of the design, the ease of set up, and overall successful operation of the vehicle. Once the mast attachment bracket has been affixed to the bicycle frame, subsequent set up for use will require as little as two minutes. In tests of the Sailbike, it has fully met all of the sailing performance criteria, and has produced controllable vehicle speeds in excess of thirty kilometers per hour. Other objects and advantages of the Sailbike will become apparent from the following specifications and accompanying drawings.

DRAWING FIGURES

Figure 1:
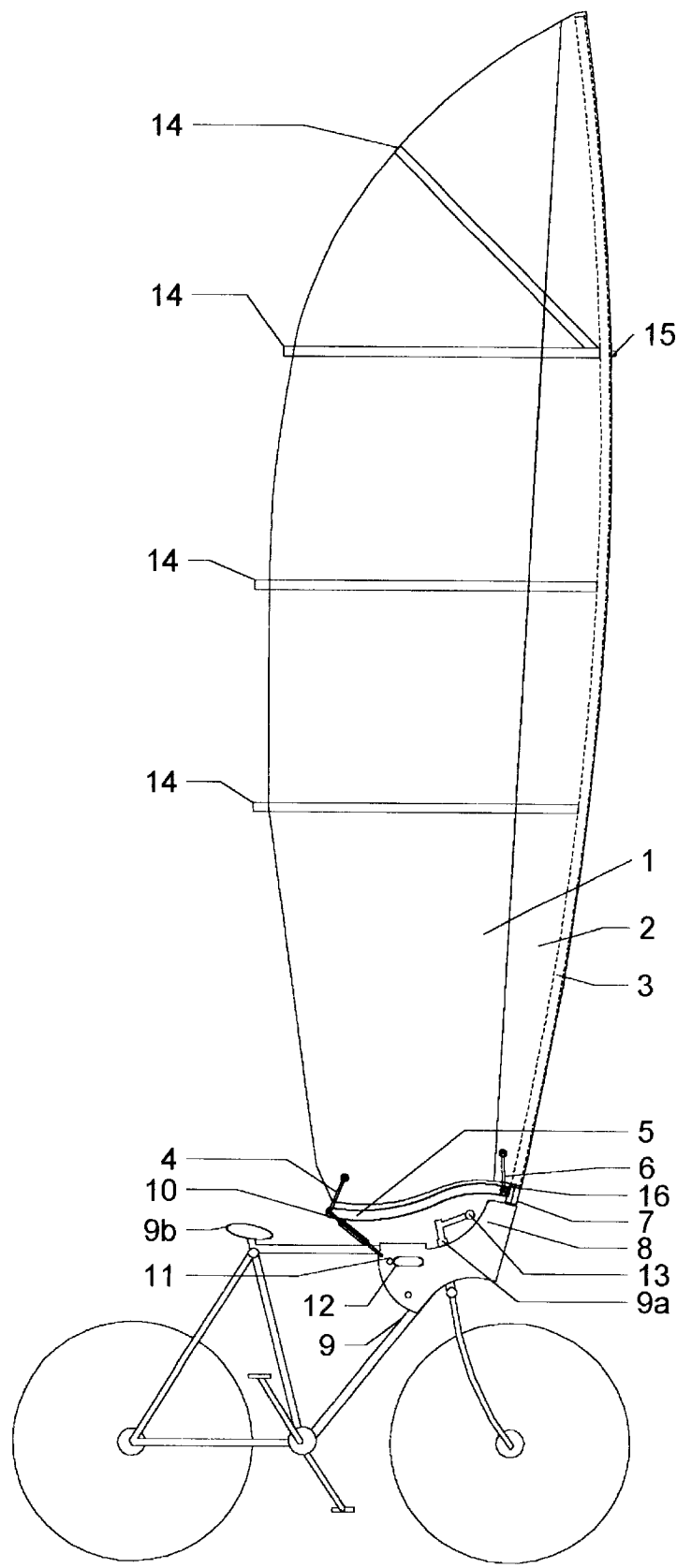
FIG. 1 illustrates a full side elevation of the Sailbike.

| Reference Numerals in Drawings | | | |
|---|---|---|---|
| 1 | sail | 8a | frame saddle |
| 2 | sail luff pocket | 8b | mast attachment bracket |
| 3 | mast | 9 | bicycle |
| 4 | fastener | 9a | steering head |
| 5 | boom | 9b | seat |
| 6 | fastener | 10 | sail trim rigging |
| 7 | gooseneck bracket | 11 | bracket fastener assembly |
| 8 | mast attachment bracket | 11a | threaded screw |
| 11c | compression gasket | 11b | coupling nut |
| 12 | access hole | 18 | reinforced eye |
| 13 | handle bar | 19 | clamping bracket |
| 14 | batten | 20 | compression shims |
| 14a | batten fitting | 21 | frame protector clips |
| 15 | spinnaker halyard fitting | 22 | compression block |
| 16 | mast step tube | 23 | sheet block |
| 17 | pin connector | 24 | halyard and cleat |
| | | 25 | spinnaker sheet |
| | | 26 | spinnaker sail |

DESCRIPTION OF THE PREFERRED EMBODIMENTS

Referring to FIG. 1, this illustrates a full side elevation of the Sailbike, including sail 1 and sail luff pocket 2, mast 3, mast attachment bracket 8, bicycle 9, and battens 14, with batten pockets. Other items indicated are shown in greater detail in FIG. 2. An optional spinnaker halyard fitting 15 is also indicated. Alternative sail design variations can be produced by combining the sail 1 and sail luff pocket 2 into a single element, and by providing other, alternative means of attachment to mast 3. Although each alternative is not specifically shown, it is intended that these alternative variations be included into this Sailbike design. The terms sail 1 and sail luff pocket 2 are in fact parts of a single sail, or vertical lift generating wing element of the Sailbike design. The Sailbike design includes both soft fabric sails, as well as rigid frame reinforced, fixed sail types.

Figure 2:
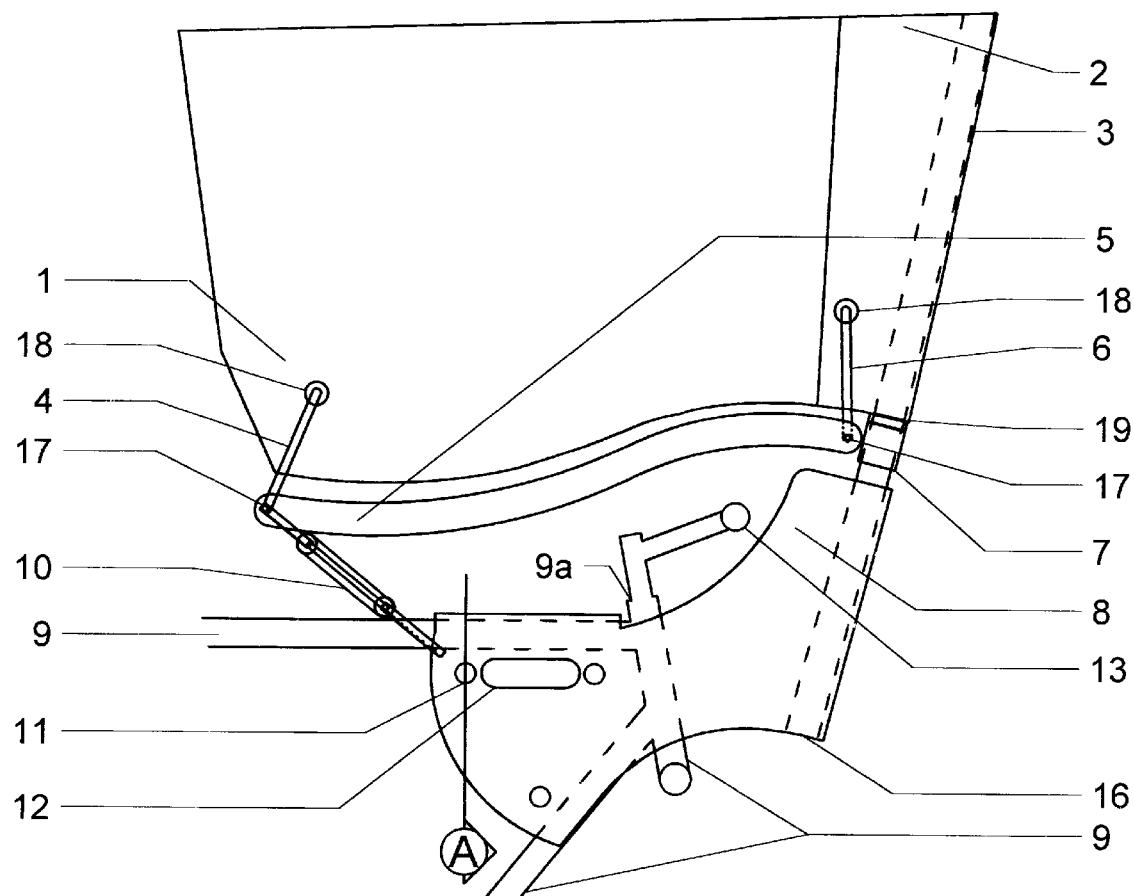
FIG. 2 illustrates a partial side elevation of the Sailbike.

Referring to FIG. 2, this illustrates a partial side elevation, and includes greater detail of; sail 1 sail luff pocket 2, mast 3, and mast attachment bracket 8.

In both FIG. 1 and FIG. 2, mast 3 has an approximate height of four meters and a diameter of approximately three centimeters. It can be a single piece construction, or alternately be sectional, with reinforced connectors. Mast 3 can be constructed of a variety of materials, however, fiber reinforced composite materials or wood, provide an effective solution which is non-conductive, and provides protection from potential electric shock. Sail luff pocket 2 is cut to match the forward bend of mast 3. The lower portion of the leech area of sail 1 has been cut at an angle so as to meet boom 5 and eliminate sail material that would otherwise strike the operator. Sail 1 is constructed of substantial material, ideally, of transparent, fiber reinforced, sail cloth. Sail luff pocket 2 is also constructed of substantial sail cloth material. The actual shape of sail 1 and sail luff pocket 2 may vary to accommodate a variety of sail design criteria. Battens 14 are of a precise size, location, and quantity as determined by the requirements of the specific sail design. Reinforced eye 18 at the tack of sail luff pocket 2 is affixed to the mast end of boom 5, by means of fastener 6, and may include a cloth line, or shackle type hardware, and by solid pin connector 17. The clew of sail 1 is affixed to the free end of boom 5 in a similar fashion at fastener 4. The free end of boom 5 is also restrained by means of sail trim rigging 10, attached to mast attachment bracket 8 with a hardware connector. The makeup of sail trim rigging 10 will vary depending on the wind's strength and operators preference, and will generally include the combination comprising; shackle attachments, turning blocks, cloth line, cleats, and the like. Also shown is gooseneck 7, bicycle 9, steering head 9a, bracket fastener assembly 11, mast attachment bracket access hole 12, handle bar 13, mast step tube 16, and clamping bracket 19.

Figure 3:
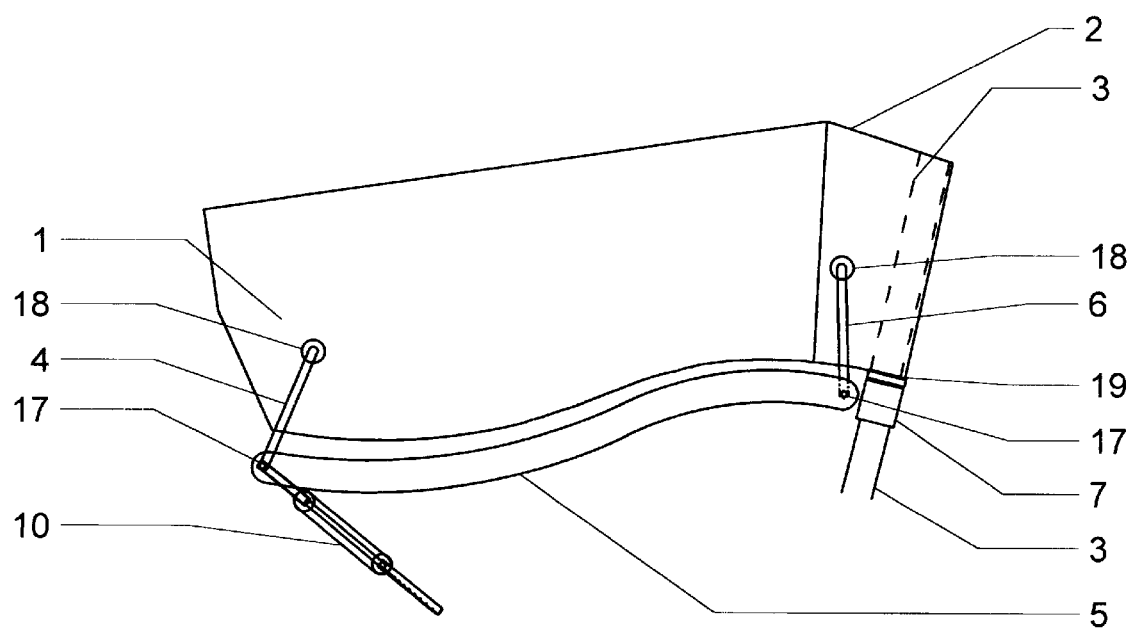
FIG. 3 illustrates a partial side elevation which shows detail of boom 5.

Referring to FIG. 2 and FIG. 3, these illustrate partial side elevations of sail 1, sail luff pocket 2, mast 3, and boom 5. Boom 5 is constructed of metal, wood, fiber reinforced composite materials, or similar materials. It is positioned slightly above handle bar 13 portion of bicycle 9, and there a mast end is affixed to mast 3, at attachment ears on gooseneck bracket 7 by means of pin connector 17. The mast end of boom 5 may also be affixed to gooseneck 7 by alternate mechanical means. Boom 5 is shaped into a shallow double curved configuration, approximately seven and one half centimeters downward and rearward from the mast end, for a distance of approximately forty eight centimeters, to a free end, positioned above the frame of bicycle 9. Sail 1 clew end, and sail luff pocket 2 tack end, are connected at reinforced eyes 18, to boom 5 by means of fastener 4 and fastener 6. Gooseneck bracket 7 is constructed of a metal tube or similar material approximately seven centimeters in height and of a sufficient diameter to provide support while permitting free rotation around mast 3. Vertical movement of gooseneck bracket 7 is prevented by means of an adjustable clamping bracket 19, which is affixed to mast 3. The free end of boom 5 is also secured to mast attachment bracket 8 by means of sail trim rigging 10, previously described.

Figure 4:
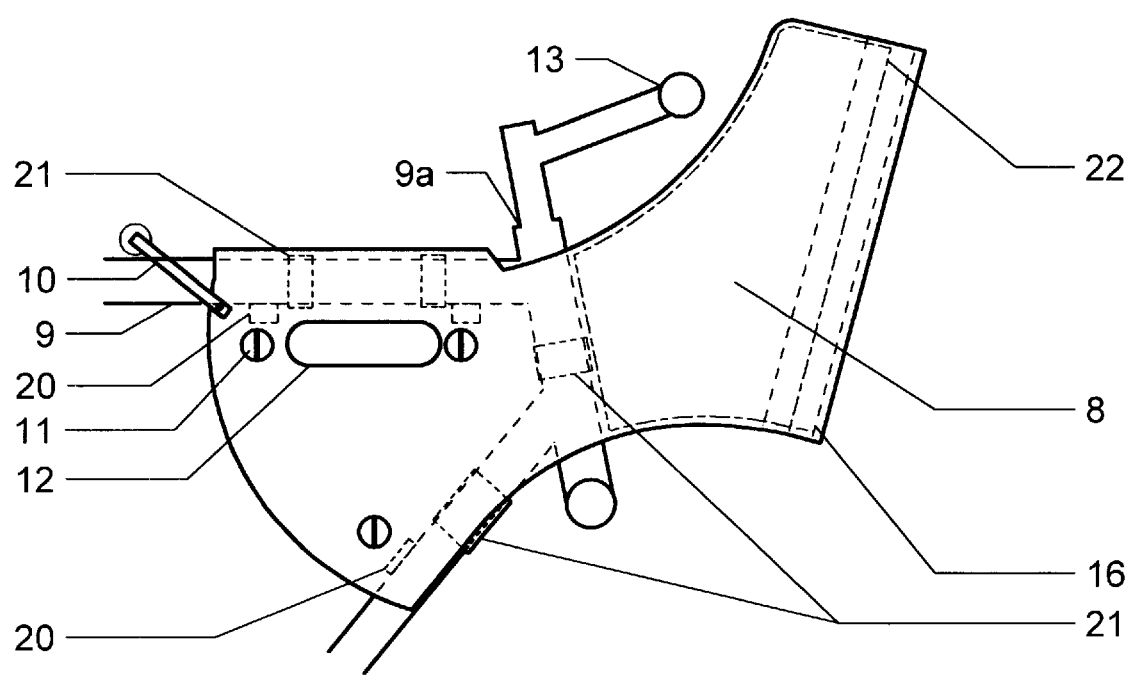
FIG. 4 illustrates a detailed side elevation of mast attachment bracket 8.

Referring to FIG. 4, this illustrates a partial side elevation of mast attachment bracket 8. This can be constructed of fiber reinforced composite materials, metal, wood, or similar materials. The final configuration will vary depending on materials selected, method of assembly, and precise configuration of the frame of the bicycle or pedal cycle, to which it is to be attached. The sides of mast attachment bracket 8 are generally flat, slab like, and three millimeters thick or thicker depending on the material used. These slab sides are tightly compressed against the frame members of bicycle 9, by means of bracket fastener assembly 11. Portions of mast attachment bracket 8 cantilever forward from steering head 9a, and may be internally reinforced by means of a compression block 22, and mast step tube 16. These are all secured together by a means appropriate to the materials used, and may include adhesives, welds, screw fasteners and the like. Mast step tube 16 has a constricted lower end to provide support for the lower end of mast 3, and a drainage hole to relieve moisture accumulation. FIG. 4 also shows the forward slope of mast attachment bracket 8 at mast step tube 16. The slab sides of mast attachment bracket 8, are provided with access hole 12 to facilitate rigging of bicycle hardware. FIG. 4 also shows the proximity of handle bar 13 to the forward portion of mast attachment bracket 8. Mast attachment bracket 8 depicted in this drawing is that of a one piece, fiber reinforced, molded unit, which provides a continuous saddle like attachment over a horizontal top tube of bicycle 9. Also shown in FIG. 4 are; sail trim rigging 10, compression shims 20, and frame protector clips 21.

Figure 4A:
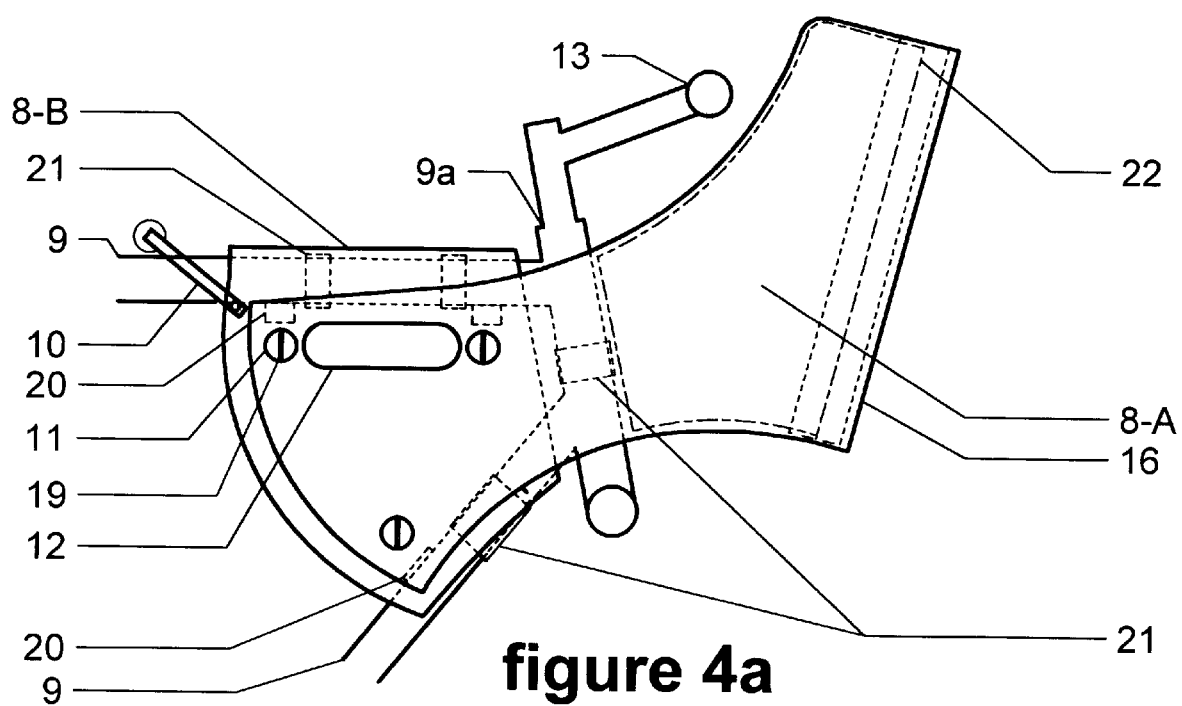
FIG. 4a illustrates a detailed side elevation of frame saddle 8a, and mast attachment bracket 8b.

Referring to FIG. 4a, this illustrates an alternate two piece assembly which includes frame saddle 8b, and mast attachment bracket 8a, and are constructed and dimensioned as described for mast attachment bracket 8 in FIG. 4.

Figure 5:
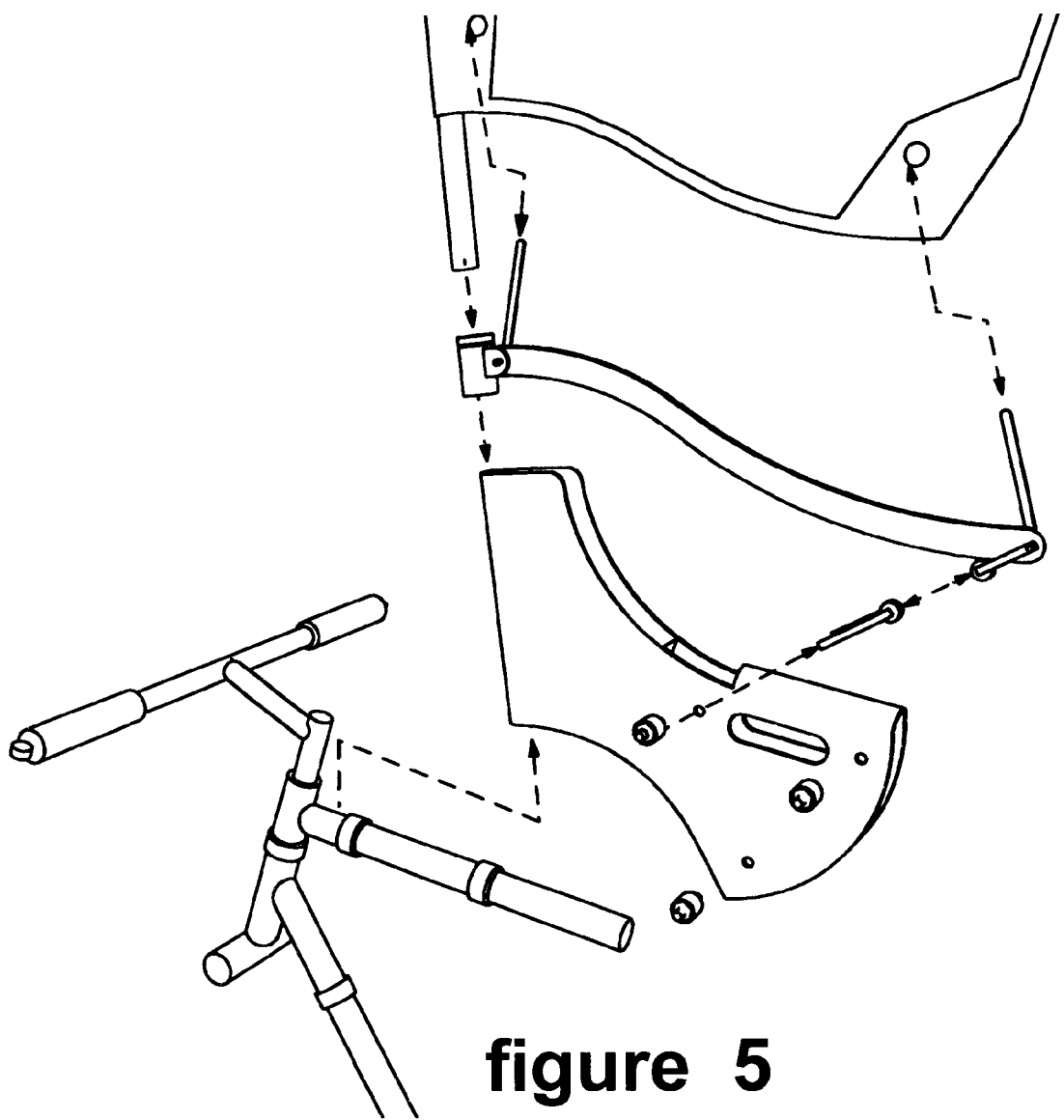
FIG. 5 illustrates an exploded three dimension view which shows the assembly relationship of the components of the Sailbike.

Referring to FIG. 5, this illustrates an exploded three dimensional view in which the assembly relationship of the components of the sail bike are depicted. These unlabeled pieces indicate the mast-sail portion at the top being inserted into the gooseneck-boom portion, and continuing into mast attachment bracket 8, which is affixed onto bicycle 9 with bracket fastener assembly 11.

Figure 6:
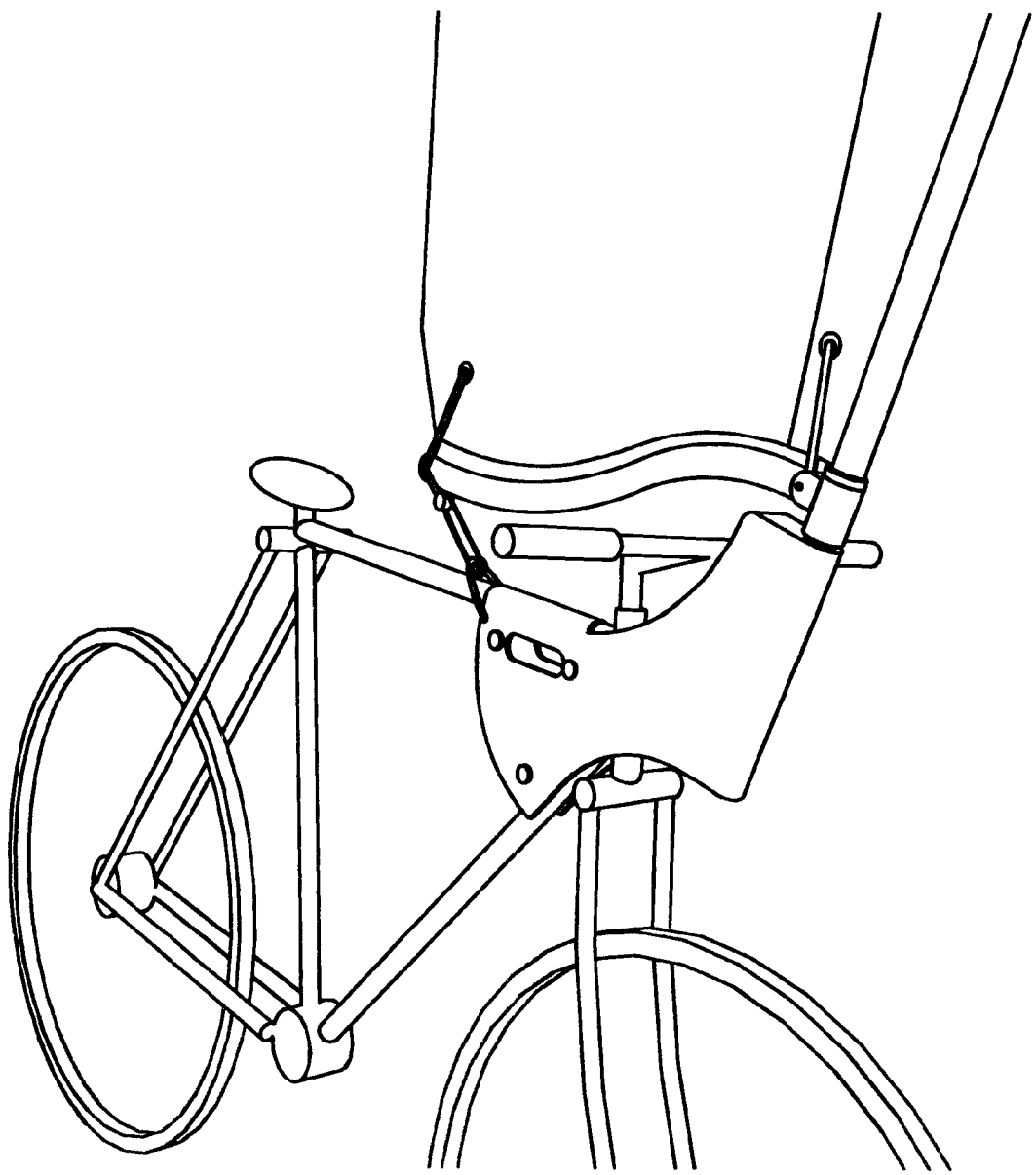
FIG. 6 illustrates a partial three dimension view of the fully assembled Sailbike.

Referring to FIG. 6, this illustrates a partial three dimensional view of the fully assembled sail bike.

Figure 7:
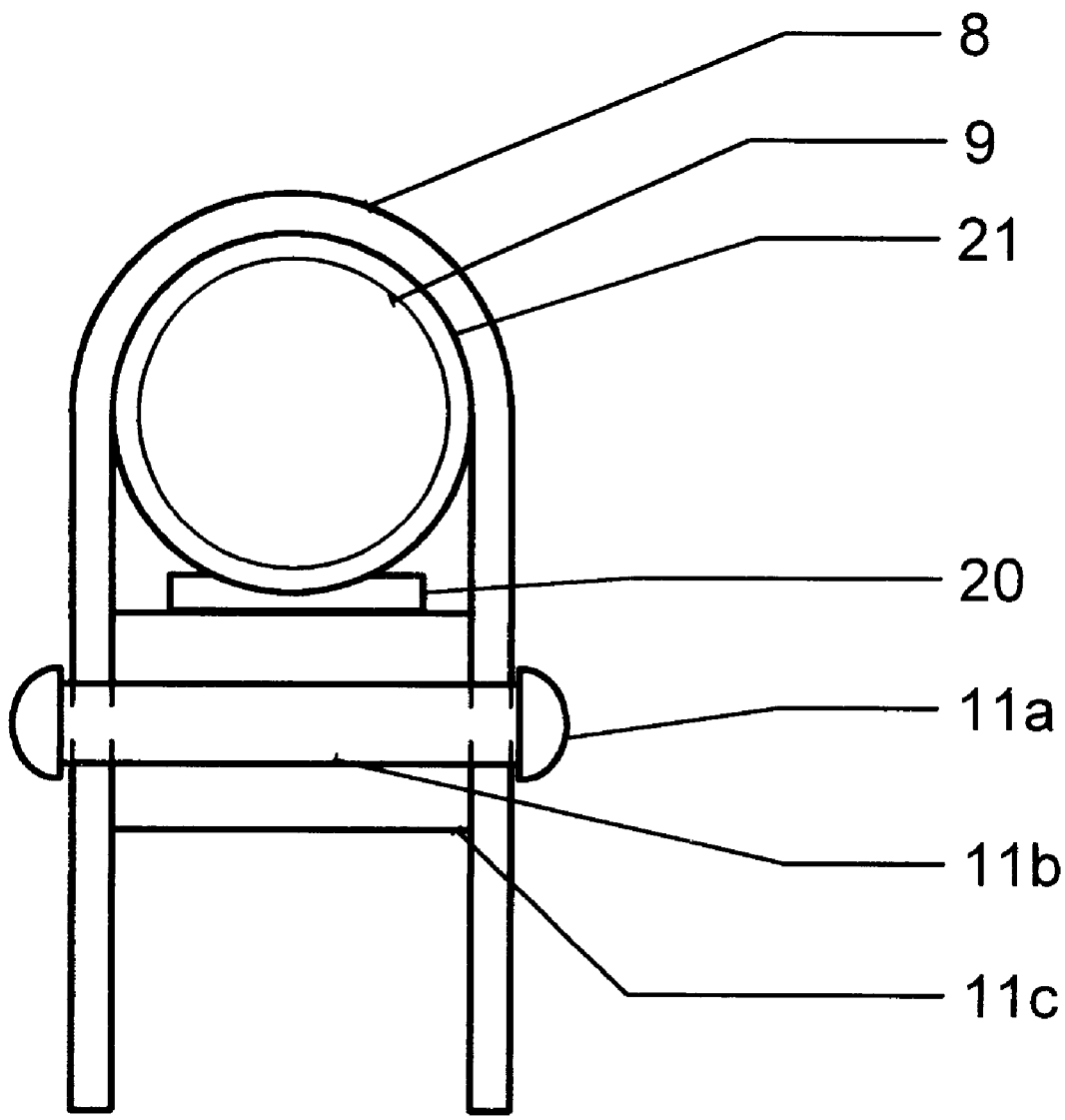
FIG. 7 illustrates a partial cross section detail which shows the connection of mast attachment bracket 8, to the frame of bicycle 9.

Referring to FIG. 7, this illustrates a portion of a cross section view of detail A—A, which shows the connection of mast attachment bracket 8, to bicycle 9. Frame protector clips 21 are provided to protect the frame members of bicycle 9 from exposure to abrasion resulting from the attachment. These may be constructed of a variety of materials, including portions of plastic tubing, and are positioned as required. Bracket fastener assembly 11, is comprised of, two threaded screws 11a, which pass through holes in mast attachment bracket 8 and are joined together by threaded coupling nut 11b. Rubber compression gasket 11c engages compressive shims 20 and frame protective clips 21, and collectively provide a compressive attachment means between the sides of mast attachment bracket 8 and bicycle 9.

Figure 8:
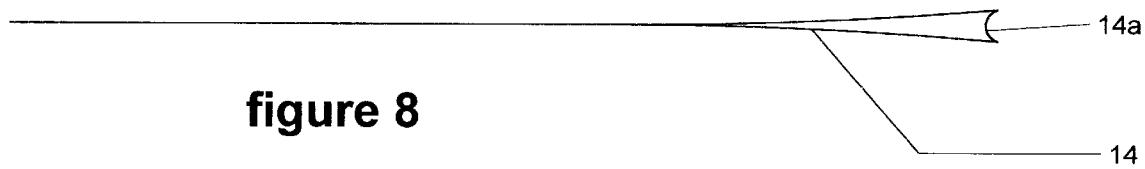
FIG. 8 illustrates a top and side view of batten 14

Referring to FIG. 8, this shows a top and side view of batten 14 which is constructed of a variety of appropriate materials including; wood, or fiber reinforced composite materials. Batten 14 as shown is a pair of parallel strips with a flexible yoke type compression batten fitting 14a, and is of sufficient size so as to firmly abut onto the face of mast 3. Alternatively, batten 14 can be a single strip, with a compression fitting at the mast end. A conventional batten pocket affixes batten 14 to sail 1. A compressive force is applied along the longitudinal axis of batten 14 so as to induce sufficient mast bend as required by the sail designs' shape. The free end of batten 14 is affixed to the leech of sail 1 by a strap or tie line means.

Figure 9:
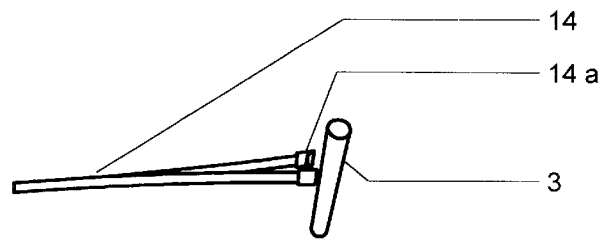
FIG. 9 illustrates partial isometric view of the connection of batten 14 to mast 3.

Referring to FIG. 9, this illustrates a partial isometric view of Batten 14, batten fitting 14a and mast 3.

Figure 10:
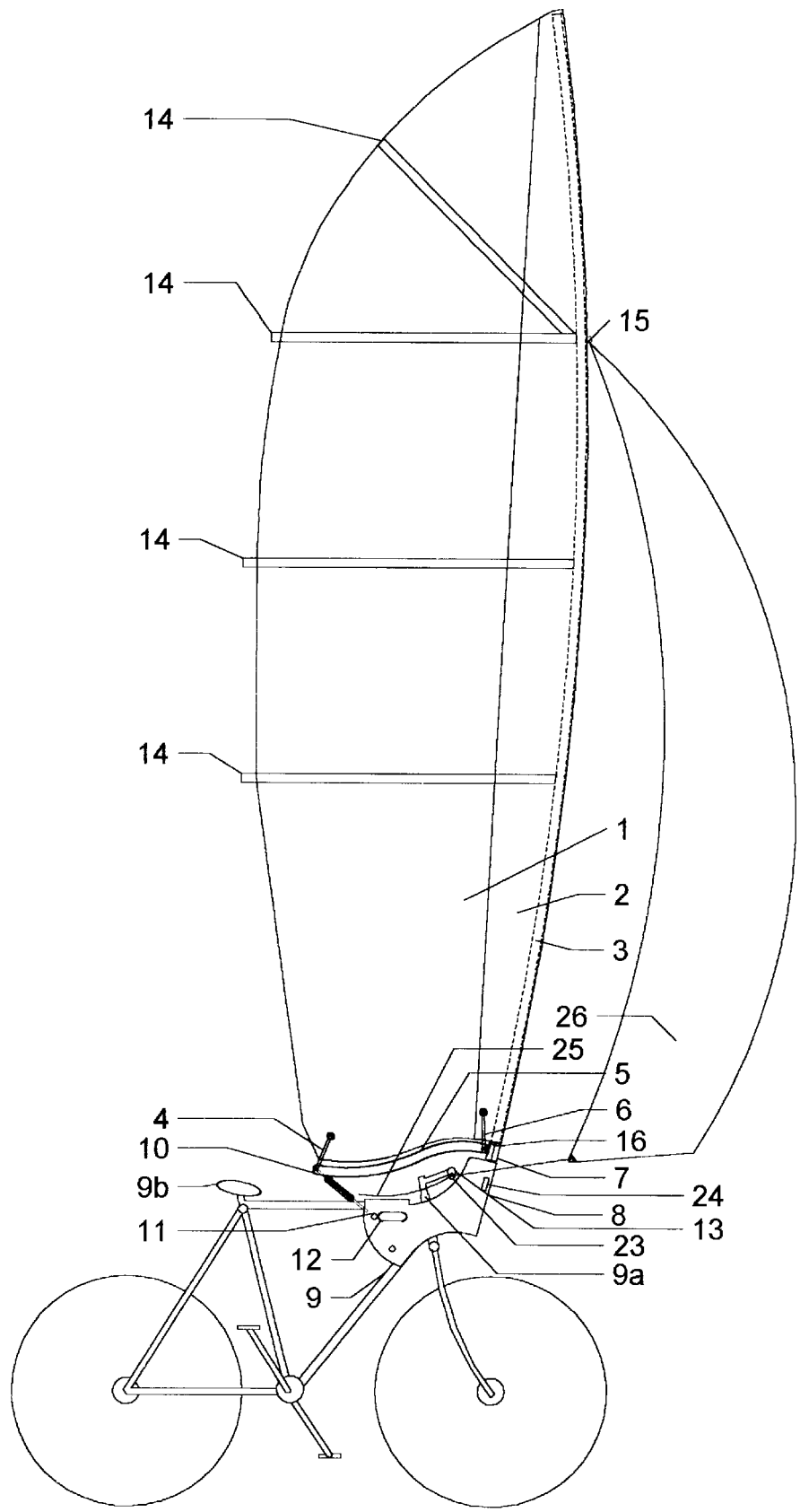
FIG. 10 illustrates a full side elevation of a Sailbike as in FIG. 1, with the addition of an optional spinnaker sail 26.

Referring to FIG. 10, this illustrates a full side elevation of the sail bike, similar to that shown in FIG. 1. In addition to those items previously identified, this view also shows an optional sail arrangement which includes; spinnaker sail 26, spinnaker halyard fitting 15, sheet block 23, halyard and cleat 24, spinnaker sheet 25. Spinnaker sail 26 is constructed of substantial material, ideally, of transparent sail cloth, or sail cloth containing a window of clear sail material. Spinnaker sheet 25, is a continuous cloth line.

Figure 11:
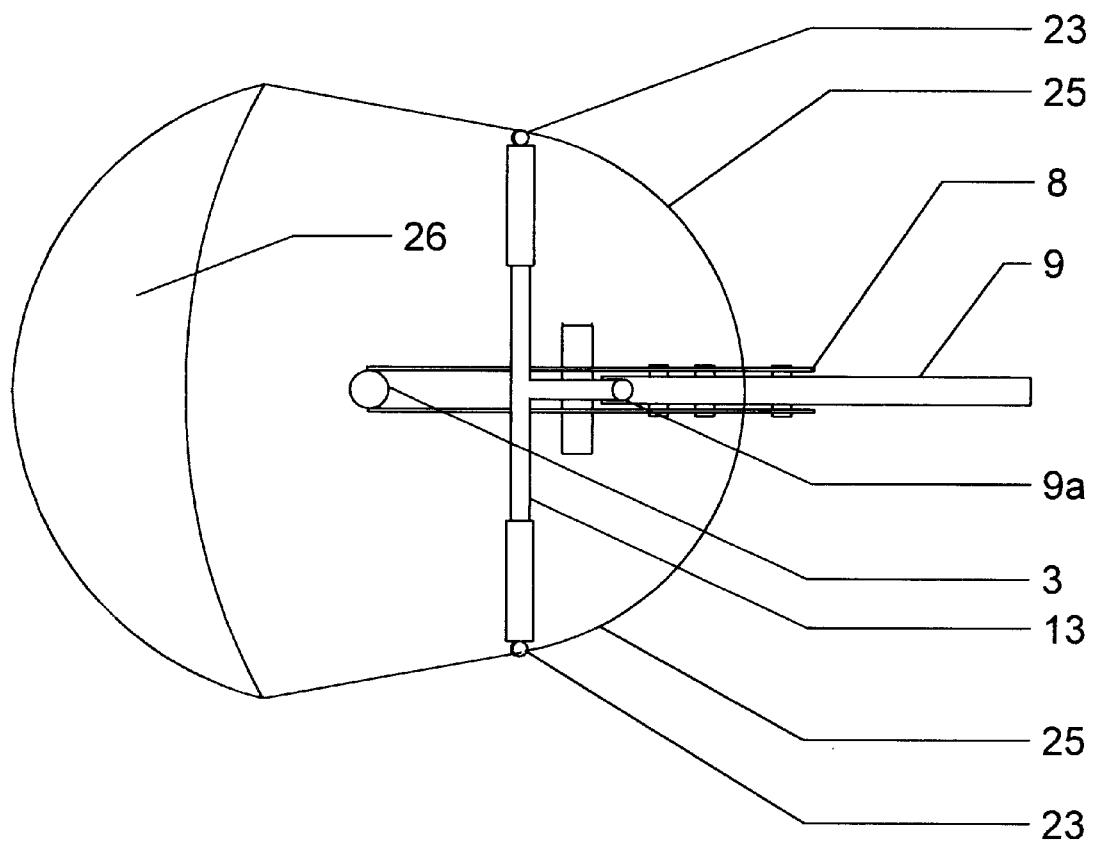
FIG. 11 illustrates a partial plan view of spinnaker sail 26, at mast attachment bracket 8.

Referring to FIG. 11, this illustrates a partial plan view of the Sailbike including a portion of bicycle 9 at steering head 9a, handle bar 13, mast attachment bracket 8, mast 3, spinnaker sail 26, spinnaker sheet 25, and sheet block 23.

OPERATION OF FIGURES

The manner of use of the sail bike is immediately apparent to those familiar with similar sailing vessels, and with bicycles or pedal cycle. The placement and configuration of the complete sail rig, which includes sail 1, sail luff pocket 2, mast 3, boom 5, and sail trim rigging 10, is very similar to that found on many sail boats, and their function is identical. What is unique to the operation of the Sailbike is the coordinated use of both pedal power, handle bar steering, and the positioning of the operator.

The one piece mast attachment bracket 8 as indicated in FIG. 1 and FIG. 4, easily attaches to a variety of standard frame configurations. The two piece mast attachment bracket 8a & 8b indicated in FIG. 4a provides an alternative attachment, and is capable of adjustments that accommodate unusual frame designs.

Mast attachment bracket 8 or 8b with 8a, is attached to bicycle 9 using the following procedure, and it remains affixed during non-sailing periods of operation. As seen in FIG. 4, or FIG. 4a, mast attachment bracket 8 or 8a & 8b is secured to bicycle 9 by means of bracket fastener assembly 11. Frame protector clips 21 are first attached to frame members of bicycle 9. Mast attachment bracket 8 or 8b with 8a is then placed over these clips. Threaded screws 11a, coupling nut 11b, and compression gasket 11c are then connected through holes in mast attachment bracket 8 or 8a & 8b. To compensate for a variety of standard frame configurations, compression shims 20 are placed between frame of bicycle 9, and compression gasket 11c. Screws 11a are tightened, and the resulting compressive forces secure all of the components firmly together. Final preparation may require adjustments to specific bicycle hardware such as repositioning of brake cables, and reflectors.

Normal setup of the sail bike for operation would involve the following procedure. Sail 1 and sail luff pocket 2 are stored in a rolled up configuration, with boom 5, gooseneck 7, sail trim rigging 10, and battens 14, all connected. These are all rolled out onto a rigging area. Mast 3 is inserted through the tube portion of gooseneck 7, and then fully into sail luff pocket 2. Each batten fitting 14a is engaged with the face of mast 3. A compressive force is then applied to the longitudinal axis of each batten 14, and the free end is restrained. This fully assembled sail rig is then moved to the bicycle, and the exposed end of mast 3 is inserted completely into mast step tube 16. Sail trim rigging 10 is connected to mast step bracket 8. Clamping bracket 19 is attached to mast 3. The Sailbike is righted, mounted, and sailed.

Generally, conventional pedal power must be utilized to provide vehicle stability during all starting or stopping maneuvers, and also whenever the wind force diminishes. The pedals also provide foot support for the operator's proper balance.

The sail bike is easily maneuvered throughout a sailing angle of 270 degrees relative to the wind's direction. Sail trim rigging 10 is adjusted so as to position boom 5 into its optimum angle relative to this wind. During such maneuvers, the operator holds sail trim rigging 10 in the leeward side hand, while steering handle bar 13 with the opposite and windward hand. For proper balance, the operator fully extends the leeward side leg, downward, onto the bicycle foot pedal, while shifting their body weight slightly to windward.

The tacking maneuver generally begins from a close hauled position and requires the operator to release sail trim rigging 10 from the leeward hand and to grasp handle bar 13 with both hands, while changing the direction of travel ninety degrees to windward. When in the new position with the relative wind again close hauled on the new tack, the operator again adjusts the position of boom 5 by placing sail trim rigging 10 into the new leeward side hand. The immediacy of this maneuver which requires less than one second to complete, is a result of the short foot length of sail 1 and boom 5, the minimal length of sail trim rigging 10, and the fact that during the tacking maneuver, boom 5 normally rotates only a few centimeters from one side of the longitudinal axis of bicycle 9 to the other.

As the sail bike is sailed on a course angle further away from the source of the wind, and onto a reach, corresponding outward adjustments of sail trim rigging 10 are easily made. Eventually, a jibe maneuver occurs when the operator changes the course of the sail bike beyond the fully downwind position, and as the position of boom 5 changes from one side of the bicycle to the other. To facilitate the jibe maneuver, the free end of boom 5 is simply grasped by the free hand and rotated into the new position.

Boom 5 while in any position of operation can fully, and instantly release all of the force of the wind. If an emergency occurs while running before the wind, the unique double curved shape of boom 5 permits sail 1, and sail luff pocket 2 to lift over handle bar 13 and to swing to a fully forward position. During all other normal controlled sailing maneuvers, boom 5 remains situated behind handle bar 13. Boom 5, sail 1, and sail luff pocket 2 are situated so as to cause no interference with the normal pedal operation of the bicycle, regardless of the sailing maneuver.

Spinnaker sail 26 is an optional parachute type sail that can only be used for downwind sailing. The head of this sail is attached to halyard and cleat 24. Spinnaker halyard fitting 15 is affixed near the top of mast 3. Continuous spinnaker sheet 25, is connected to one tack of spinnaker sail 26, led through sheet block 23 at one end of handle bar 13, then through a similar fitting at the opposite end of handlebar 13, then connected to the opposite tack end of spinnaker 26. Sheet blocks 23, and handlebar 13, function as a spinnaker pole and maintain proper transverse positioning of the sail. Continuous spinnaker sheet 25 requires little trimming adjustment, and does not have ends that could become entangled. This optional sail arrangement supplements the main sail, and adds significantly to the performance when running in light winds. However, it also adds to the complexity of operation of the otherwise simple, single sail arrangement. When not in use, spinnaker sail 26, and spinnaker sheet 25, are easily stored in a small sail bag attached to handle bar 13.

When not in use, sail trim rigging 10 and clamping bracket 19 are released. The full sail rig is removed from mast step bracket 8, and placed onto the rigging area. The end restraint at each batten 14 is released, and mast 3 is removed from sail luff pocket 2. Sail 1, sail luff pocket 2, boom 5, gooseneck 7, sail trim rigging 10, and battens 14, are all rolled up, in a direction from foot to head, and placed into a sail bag for storage. If mast 3 is a sectional type mast, pieces are detached and also stored. Thus, when not in use, all of the components of the Sailbike can be easily transported.

At no time does mast attachment bracket 8, or 8a with a frame saddle 8b, interfere with the proper operation of handlebar 13. When mast 3 is inserted into mast attachment bracket 8 the angle of rotation of handlebar 13 becomes limited to approximately 105 degrees. However, during road tests, the maneuverability requirements of the Sailbike were never restricted by this limitation. The operator does not have the need or inclination to rotate handlebar 13 beyond 105 degrees until the vehicle slows to a nearly stationary position.

A static analysis of the fully rigged Sailbike would indicate that the tall sail rig could develop large overturning forces when exposed to strong winds. However, empirical evidence collected while testing the Sailbike under such conditions, has shown the Sailbike to be very stable. A Sailbike test rider weighing forty five kilograms, safely reached speeds of more than thirty kilometers per hour, without encountering such theoretical overturning forces. The Sailbikes' stability results from proper mast bend, sail shape, sail position, the immediacy of sail trim adjustments, the dynamic stabilizing forces of the wheel rotation, and ease of adjustment of the rider's body position.

The attachment and use of the components and principles discussed for the Sailbike are well suited to standard two wheeled bicycles, to special recumbent bicycles, and to tricycles and similar vehicles.

SUMMARY, RAMIFICATIONS, AND SCOPE

From the description above, a number of important advantages of the Sailbike design become evident. The Sailbike provides the first design solution to the problem of mounting a sail rig onto a bicycle or pedal cycle, and that permits the resulting vehicle to function fully, completely, safely, and properly, as a true sailing vehicle, and;

1. utilizes a highly efficient, lift generating wing, sail shape, and 2. utilizes a highly efficient bracket design to position the sail rig, and 3. utilizes simplicity of design and requires a minimum of components, and 4. is easily set up and attached to the frame of a standard bicycle or pedal cycle, and 5. is fully capable of all maneuvers of other, true sailing vehicles, and 6. will sail on all course headings throughout 270 degrees relative to the wind, and 7. will sail close hauled, reach, and run before the wind, and 8. will permit immediate tacks and jibes and continuous sail trimming, and 9. will permit immediate release of all wind force while in any position, and 10. permits maximum sailing benefit while maintaining safe operating environment, and 11. permits use all functions of standard bicycle including pedal power to supplement sailing.

What is claimed is:

1. A wind-propelled pedal cycle or bicycle comprising:
    a. a cycle frame comprising a top member, a head tube mounted to a forward end of the top member, and a seat mounted on said top member;
    b. a sail rig comprising:
        1) a sail having a shape with a high aspect ratio of vertical measurement to horizontal measurement, positioned vertical and upright and fully forward of the seat,
        2) a mast affixed to a luff edge of said sail and transversely aligned with a central longitudinal axis of the cycle,
        3) a boom extending generally horizontally from the mast,
        4) a plurality of battens affixed at predetermined locations on the sail,
        5) rigging means for rotationally repositioning said sail rig,
        6) a mast attachment bracket comprising:
            A) a frame saddle demountably mounted around the top member by attachment means,
            B) a pair of bracket sides demountably attached to said frame saddle and extending forwardly of the head tube,
            C) a mast step tube sandwiched within said pair of bracket sides, said mast being mounted in said mast step tube,
whereby the pedal cycle or bicycle propelled by force of wind performs sailing maneuvers including:
    a. sailing on course heading throughout 270 degrees relative to the wind, and
    b. sailing close hauled, reaching, and running before the wind, and
    c. tacking and jibing and continuous sail trimming and releasing all wind force.

2. The wind-propelled pedal cycle or bicycle recited in claim 1 wherein said mast has a height of approximately four meters, and the boom has a length of approximately forty-eight centimeters.

3. A wind-propelled bicycle or pedal cycle in combination with a lift generating sail rig, said sail rig being demountably affixed by a bracket means to a frame top member of the bicycle or pedal cycle, said sail rig comprising:
    a. a sail having a predetermined shape with a high aspect ratio of vertical measurement to horizontal measurement, positioned vertical and upright,
    b. a mast mounted to the bracket means and affixed to a luff edge of said sail,
    c. a plurality of battens affixed at predetermined positions on the sail,
    d. a goose neck bracket pivotally secured at a predetermined position on said mast,
    e. a boom positioned at a foot edge of the sail,
        1) said boom having a predetermined size and shape,
        2) a forward end of the boom pivotally affixed to said goose neck bracket and a rearward end of the boom affixed to a clew end of the sail,
    f. a rigging means to rotationally reposition said lift generating sail rig,
    g. said sail positioned fully forward of a seat location of the bicycle or pedal cycle, the mast transversely aligned with a central longitudinal axis through the bicycle or pedal cycle and is positioned at a location forward of a vertical axis extending through a steering head portion of the bicycle or pedal cycle, and the lift generating sail rig provides a means to propel by a force of wind the bicycle or pedal cycle and perform sailing maneuvers including:
        1) sailing on course headings throughout 270 degrees relative to the wind,
        2) sailing close hauled, reaching and running before the wind, and
        3) tacking and jibing and continuous sail trimming and releasing all wind force.

4. The wind-propelled bicycle or pedal cycle recited in claim 3 wherein the mast has a height of approximately four meters and a diameter of approximately three centimeters.

5. A wind-propelled bicycle or pedal cycle in combination with a spinnaker sail rig comprising:
    a) a bicycle or pedal cycle frame and handlebars rotatably mounted to the frame,
    b) a spinnaker sail,
    c) a mast mounted upright and vertical on the frame,
    d) a means to affix a head portion of the spinnaker sail on the mast,
    e) first and second sheet blocks affixed at respective ends of the handlebars,
    f) a spinnaker trimming apparatus comprising a spinnaker sheet affixed to a clew end of the spinnaker sail and extending freely through said first sheet block, then through said second sheet block, and finally affixed to an opposite clew end of the spinnaker sail,
    whereby said spinnaker trimming apparatus provides means to control said clew ends of the spinnaker sail, and
    whereby the spinnaker sail provides means to propel said bicycle or pedal cycle by a force of wind while running before the wind.

* * * * *